United States Patent

Stark

[11] 3,984,716
[45] Oct. 5, 1976

[54] SLIP RING AND BRUSH ARRANGEMENT

[75] Inventor: Paul Stark, Ennetbaden, Switzerland

[73] Assignee: BBC Brown Boveri & Company Limited, Baden, Switzerland

[22] Filed: Mar. 25, 1975

[21] Appl. No.: 561,999

[30] Foreign Application Priority Data
Apr. 17, 1974 Switzerland............... 5277/74

[52] U.S. Cl.................. 310/232; 310/227; 310/241
[51] Int. Cl.² ......................... H02K 9/28
[58] Field of Search .......... 310/232, 233, 237, 235, 310/231, 227, 236, 219, 228, 230, 229, 239, 54, 51, 241, 242, 245, 247, 52, 58, 61, 60, 59, 55

[56] References Cited
UNITED STATES PATENTS

| 1,066,175 | 7/1913 | Barry | 310/227 |
|---|---|---|---|
| 2,790,100 | 4/1957 | Caputo | 310/227 |
| 2,950,403 | 8/1960 | Kilner | 310/232 |
| 3,396,586 | 8/1968 | Maclin | 310/232 |

FOREIGN PATENTS OR APPLICATIONS

| 253,312 | 5/1963 | Australia | 310/227 |
|---|---|---|---|
| 699,037 | 11/1940 | Germany | 310/232 |
| 358,226 | 6/1920 | Germany | 310/232 |
| 1,266,866 | 4/1968 | Germany | 310/232 |
| 820,765 | 11/1951 | Germany | 310/232 |

*Primary Examiner*—R. Skudy
*Attorney, Agent, or Firm*—William R. Woodward

[57] ABSTRACT

A slip ring for the transfer of very large currents to the rotor of an electric power generator is provided with a slip contact surface in the form of a surface of revolution oblique to the axis of rotation that is a ruled surface, which is to say straight lines (known as generatrices) can be drawn on it, whether the surface be flat, as a conical surface, or curved as, for example, a hyperboloidal surface. Cooling grooves centered on straight lines are provided, as well as cooling channels beneath the surface and parallel to it, through which air passes and may thereafter be used to cool the brushes and their supports. The brushes are arranged on self-adjusting ring-shaped carriers hung on centering arms rolling on axially directed guides and urged by a spring arrangement so as to press the brushes towards the slip ring. When one ring of brushes is worn away, it is carried beyond the slip ring where it can be removed for renewal and new rings of brushes can be added, all without stopping the generator.

19 Claims, 10 Drawing Figures

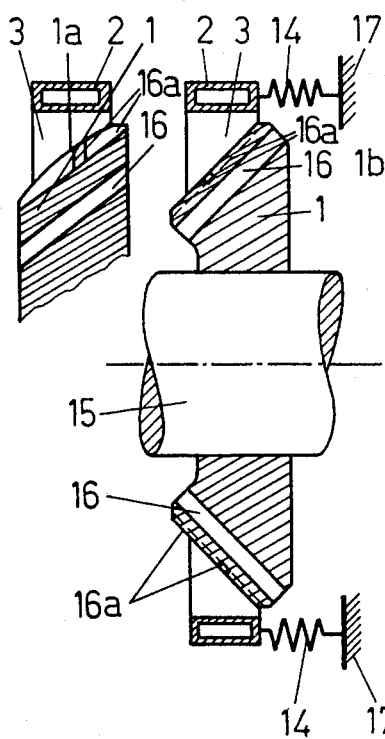
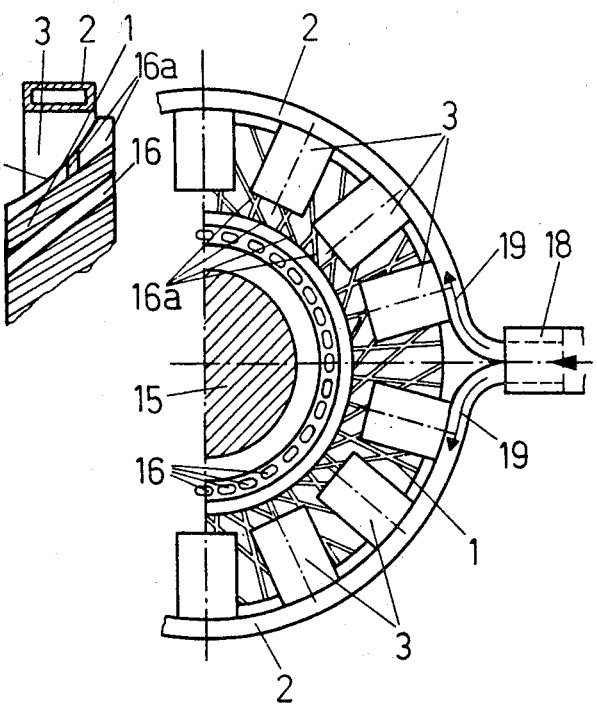
FIG.1c  FIG.1d
FIG.1a  FIG.1b

SLIP RING AND BRUSH ARRANGEMENT

This invention relates to a slip ring and brush structure for rotating electric machines, particularly turbine-driven electric generators.

The known means for transferring current to turbine-driven rotors from external circuits are constituted of slip rings having cyclindrical surfaces and a large number of carbon brushes guided in holders, the brushes being pressed against the running surface of the slip ring by springs. The current transfer and friction energy losses are dissipated by ventilation of the slip rings and of the brushes or of the individual brush holders. In the case of turbine-driven generators of high-power output, the above-mentioned current transfer means for exciting currents in excess of about 5000 amperes has relatively large space requirements, involve considerable losses and, moreover, in comparison with machines having relatively smaller slip ring circumferential velocity (V less than 50 meters per second) have a brush wear that is far above proportionality to size or rating.

The large space requirements just mentioned for current transfer means in large machines is the result particularly of the physical limitations of the utilization of such a current transfer system, described in the following review of the problem.

The number of the carbon brushes on the circumference of the slip rings is limited by the resulting heat losses and by the sliding qualities of the carbon brushes.

Moreover, the current density in the brushes cannot be increased substantially higher than about 10A/cm$^2$ because of the variability of the contact effect as well as because of the limited possibilities of carrying away the heat generated by the energy losses.

Since, in addition, with the increase of the circumferential velocity there is a deterioration of the contact between the brushes and the slip rings, it is necessary to lengthen the shafts for turbine-driven generators of increased power capacity, to accommodate the increasing magnitude of the excitation currents and likewise of the current transfer means, with disadvantageous consequences, in general, for the vibration behavior of the rotor. Furthermore, the shrinking on of wide slip rigns is difficult.

There remains to be mentioned the cause of the overproportional brush wear in the case of higher slip ring velocities (V>≈75 m/sec) compared to cases of smaller velocities (V<50 m/sec). It is possible to obtain reasonably trouble-free running characteristics for brushes held in the known or conventional brush holders at high circumferential velocities only by using carbon brushes of soft and porous composition. Such brushes wear away much faster than compact brushes.

It is an object of the present invention to provide a slip ring and brush structure for current transfer at densities greater than 20A/cm$^2$ with only small space requirements and at the same time, reduce the total brush wear and the losses to a fraction of the values occurring with conventional current transfer systems.

SUBJECT MATTER OF THE PRESENT INVENTION

Briefly, the slip ring is provided with a slip contact surface that at least approximately has the shape of a zone of a ruled surface symmetrical with the axis of the machine and of the slip ring and having generatrices that are oblique to that axis and the slip ring is further pierced by cooling channels parallel to that slip contact surface and that surface is interrupted by cooling grooves. The brushes are fastened adjacent to each other in the circumferential direction on brush carriers so as to form axial rows of brushes respectively carried by neighboring carriers, so that the brushes advance in rows continuously in succession in the axial direction, this being provided by means of a guiding system provided with resilient elements.

The resilient mountings and interconnections make thhe brush arrays both circumferentially and axially self-adjusting and bi-metal strip structures may be used here to make automatic adjustments for excess generation of heat at one or more brushes. Connection and disconnection arrangements are provided to enable brushes, that have been worn away and have been pushed beyond the slip ring by the spring pressure means of the equipment according to the invention, to be dismounted and for a brush carrier loaded with new brushes to be mounted at the feed end of the axial succession of brush rings without stopping the machine.

The brushes and brush holders may be air cooled with the help of a baffle for deflecting air issuing from the cooling grooves and channels of the slip ring towards the brush holders, or provision may be made for cooling the brush holders with a liquid medium.

As mentioned above, the slip contact surface of the slip rings, according to the invention, is a ruled surface. By the term "ruled surface" is to be understood a surface that can be generated by the motion of at least one straight line in space. Among such surfaces there are included the cylinder, the cone and so-called tangential surfaces generated by tangents, all of which are known as developable ruled surfaces, because they can be flattened into a plane without distortion, stretching or crumpling. There are also non-developable ruled surfaces, for example, the skewed ruled surfaces, such as the single-shell hyperboloid, and hyperbolic paraboloids. Indeed a spherical surface can be regarded as a limiting case of a ruled surface and hence, like surfaces approximating ruled surfaces, can be used for the purposes of the invention. Many ruled surfaces are known to the decorative arts because they can be generated by families of stretched fibers or the like.

The slip contact surface of a slip ring, in accordance with the invention, is an axially symmetric zone of a ruled surface having generatrices oblique to the axis. The most easily produced form of such a contact surface, with just one family of generatrices, is a conical surface. Other ruled surfaces, as for example, a zone of a single-shell hyperboloid of revolution, are of significant advantage in particular cases subject to distrubance movements of the slip ring shaft, because they provide a more stable contact than the corresponding conical form.

It is particularly advantageous, as already mentioned above, to provide a network of cooling channels in the form of grooves on the contact surface in accordance with the invention, since the air provided through these channels can cool both the slip ring and the brushes and can carry away from the contact surface the material worn off the brushes and thus reduce the brush wear.

The simplest kind of liquid cooling of the brushes can be accomplished by providing the brush carrier in the form of two half rings or semi-circular shaped tubes each with an inlet and outlet for the cooling liquid and fastening the brushes by their mounting plates onto these carriers. The half rings are particularly advantageous in order to permit mounting and unmounting the brush carrier even during the operation of the machine.

An advantageous elaboration of the brush mounting arrangement is provided by the provision of means for damping the brush vibrations excited by friction instability, by placing damping means between the brushes or the cooling body and the brush carrier.

Furthermore, even distribution of current that is so difficult to obtain at high slip ring speeds, a matter that is of particular importance at current intensities in excess of 20 amperes per square centimeter, can be obtained with a vibration-damping fastening of the brushes, by providing the current flow from the brush carriers to the brushes with a path that leads it through collections or structures of bi-metallic strips, by means of which the brush contact is variable by change of the strip shape in consequence of the heat generated in the strip by the current.

It has also been found useful to connect together the cooling bodies provided for the brushes by interposing vibration damping elements, in order thereby to obtain an increase of the stability of brush operation.

The particular advantages of the invention compared to the known solutions of the problem of current transfer to moving rotors by means of carbon brushes and slip rings accordingly consist in a far better contact behavior and in much more effective cooling both of the brushes and of the slip ring. The better contact behavior in this case resides in the fact that the brushes as a group are less disturbed, in their contact behavior than brushed mounted in conventional brush holder, by the unavoidable surface faults of the slip rings such as waviness and roughness or by rapidly changing friction values of the brush contact, this superiority resulting at least in part from the firm mounting in a common elastically guided ring-shaped brush holder pressed axially against the slip ring. In addition, with increased time of operation of the arrangement a reduction of the waviness or roughness of the surface of the slip ring is produced and the contact quality is thereby increasingly improved, whereas contact quality gets worse with increase of operating time in the case of conventional slip contact arrangements. The movements of the slip ring caused by eccentricity and a shock transmitted by the shaft allow the brushes to follow the movement as a result of the mobility and elasticity of the brush carrier and/or of the means for fastening the brushes on the carrier. Moreover, the characteristics just mentioned make possible an accommodation even to coarse deviations of the slip ring surface from the circular contour, as for example, ellipticity, so that a stable contact behavior is assured.

The firm mounting of the brushes on a ring-shaped brush carrier and their axial course of motion provides the further advantage of a simple and effective cooling through the brush brackets, which can be accomplished either with a liquid cooling medium or by air cooling. For the cooling of the slip ring the contact surface shape in accordance with the invention has the advantage of a far better cooling than is the case with cylindrical slip rings, because both the cooling channels located below the surface as well as those on the surface produce large radial components in the direction of air flow and thus provide an effective self-ventilation of the slip ring, so that a supplementary blower is made unnecessary.

The advantage of the better contact behavior of the brushes provided by the structure according to the invention makes it possible to operate with brushes of a compact constitution even at high circumferential velocities of the slip ring surface, and, in particular, also makes possible the use of brushes having a metal content, for as a result of the contact principle according to the invention no special requirements regarding low mass for reasons of inertia or regarding a large internal damping are significant any longer. The brushes that now become available for use have a many times better heat conduction capability and a much smaller rate of wear than brushes that are distinguished by spongy constitution. By the practice of the invention, there is further assured an even wear of the brushes because the application pressure and consequently the current transfer and, ultimately, the wear of any brush that shows a tendency to wear more than its neighboring brushes is automatically reduced.

The strongly improved dissipation of heat generated by losses, compared to conventional means, as well as the concurrent increase of the contact quality between brushes and slip rings allows the current density in the brushes to be increased far above 20A/cm$^2$ and likewise allows the number of brushes or their density of space occupancy around the circumference to be increased, as the result of which, together with the above-mentioned elimination of the necessity for a blower, the axial space requirement and the losses are significantly reduced. The smaller axial space requirement in turn permits a shortening of the rotor shaft, which, in general, has a favorable effect on the vibration behavior of the rotor, particularly the rotor of a turbine generator. By the use of relatively narrow slip rings, there is also as a further consequence the opportunity to take advantage of the manufacturing advantage that narrow slip rings, in contrast to broad forms of these devices, can be shrunk into place without trouble.

The invention is further described by way of illustrative examples by reference to the accompanying drawings, in which:

FIG. 1a is a diagrammatic axial cross-section of a slip ring and brush structure that is provided with a liquid-cooled brush carrier;

FIG. 1b is a corresponding front view of the structure of FIG. 1a seen in the axial direction of the electrical machine, with only the right half of the structure shown in view of the symmetry of the structure;

FIG. 1c is an axial cross-section, partly broken away, of a modified form of slip ring with associated brushes, of which only one appears;

FIG. 1d is an axial cross-section, partly broken away, of still another form of slip ring with an associated brush;

FIG. 2b is a front view of the structure of FIG. 2a;

FIG. 3b is a front view of the structure of FIG. 3a;

FIG. 4b is an end view of a quadrant of the structure shown in FIG. 4a.

Figure 2A:
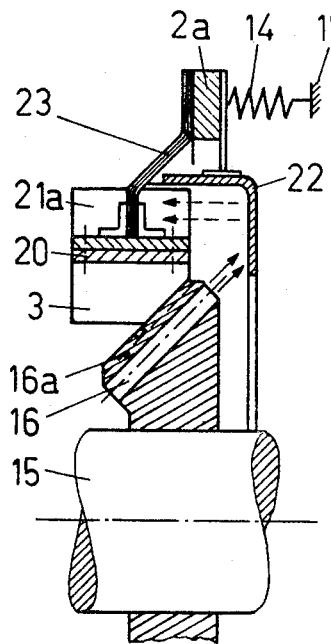
FIG. 2a is an axial cross-section of a slip ring and brush structure having air cooled brushes with eleastic and vibration damping fastening means.

As shown in FIG. 1a, the ring-shaped brush carrier 2 equipped with brushes consists essentially of at least one rectangular tube through which water flows, on the inward side of which the brushes 3 are fastened by copper brackets not shown in this figure. The brush carrier 2 is pressed in the axial direction against the conical slip ring 1 by the spring 14 mounted on a fixed member 17 of the machine frame, the spring 14 being diagrammatically shown as a helical spring, but in practice being a roll-up strip spring as more particularly shown in FIG. 4a.

The waste heat arising on the running surface of the slip ring 1 is on the one hand led away to the liquid cooled brush carrier 2 over the relatively short path provided by the brushes 3 that are of compact structure, thus providing a relatively small temperature drop, and on the other hand, it is dissipated by a very effective self-ventialtion of the slip ring 1 provided by the cooling channels 16 running parallel to the conical surface of the slip ring 1 and, at the same time, spreading out radially, being preferably of circular cross-section, as well as by the network of cooling grooves 16a present on the surface of the slip ring 1, so that no blower is needed to provide forced air cooling.

The division of the ring-shaped brush carrier 2 into two parts is shown in FIG. 1b, this providing for supply of the cooling liquid through the inlet 18 to cause it to flow in the direction of the arrows 19 separately over the two halves of the brush carrier 2 after which the cooling liquid flow is recombined and carried away. The other features of FIG. 1b correspond to those visible in FIG. 1a.

FIG. 1c shows a longitudinal section of a slip ring 1 that differs from the slip ring of the same designation of FIG. 1a by having a convex surface 1a. The contact surface convex towards the brushes 3 and in accordance with the invention, conforms to a ruled surface.

FIG. 1d is similar to FIG. 1c, with the difference that the contact surface of 1b of the slip ring 1 is concave toward to brushes 3 and may, for example, be in the shape of a zone of a single-shell hyperboloid or shaped to approximate a sector of the surface of revolution formed by revolving a circular arc about the machine axis. The last named type of surface may approximate a ruled surface to a sufficient degree of approximation for the practice of the invention.

In FIGS. 1c and 1d the cooling channels are again designated 16 and the cooling grooves 16a. Similarly to the corresponding features of FIG. 1a, the grooves are provided on the slip ring surface and the internal channels are provided with their axes approximately parallel to the slip ring surface.

If liquid cooling of the brushes 3 is not possible or not desired, effective air cooling of the brushes can obtained by interposing air cooled cooling bodies 21a between the brushes and the brush carrier 2.

Figure 2B:
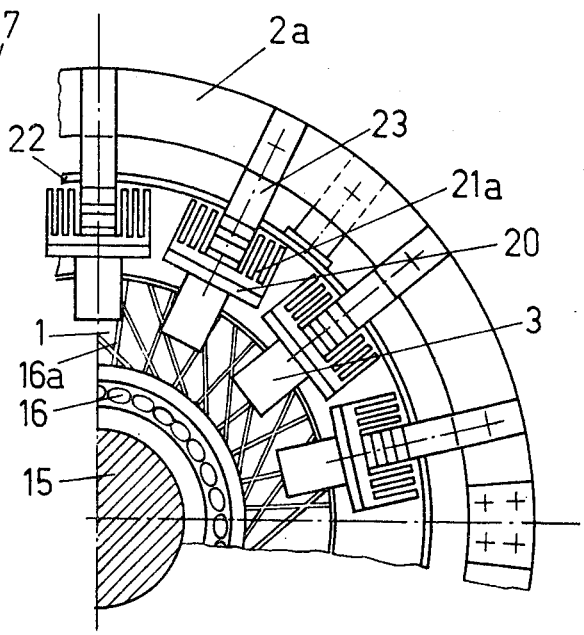

FIGS. 2a and 2b shown a structure with air cooled brushes. The cooling air supplied from the slip ring 1 is deflected by an air guiding baffle 22 toward the air cooled cooling bodies 21a, as indicated by the broken-line arrows in FIG. 2a. The cooling bodies 21a are connected to the brush carrier 2a, which in this case is not water cooled, by elastic and vibration damping fastening members 23 and the brushes 3 with their mounting brackets or plates 20 are screwed fast to the cooling structures 21a. In order to obtain an even distribution of current, the elastic and vibration-damping fastening members 23 can consist entirely or in part of bi-metal strips, which by variation of their temperature as a result of inequalities in the current distribution will produce a change of the brush contact with the effect of evening out the current distribution.

Figure 3A:
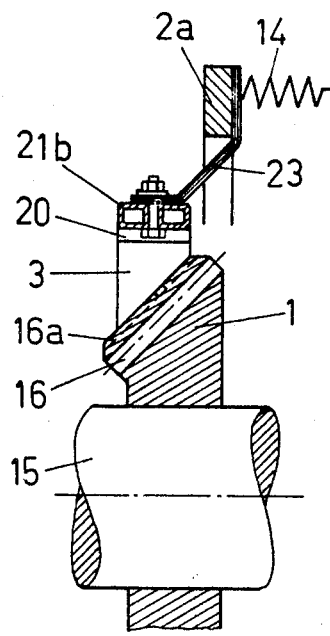
FIG. 3a is an axial cross-section of an illustrative embodiment provided with liquid cooled cooling bodies with elastic and vibration damping fastening means.
Figure 3B:
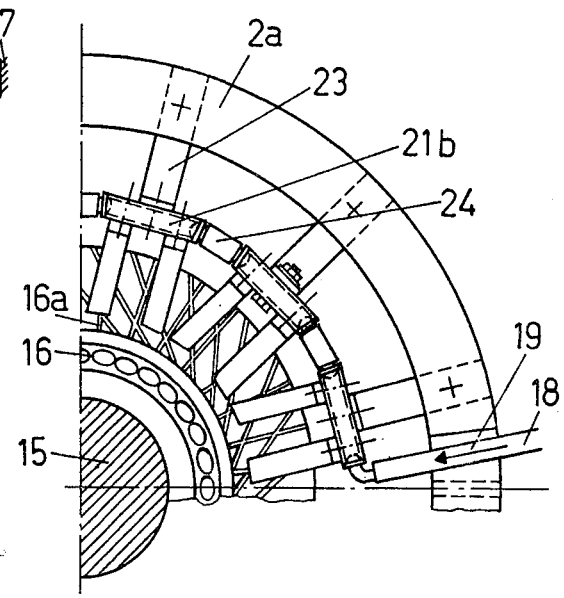

FIGS. 3a and 3b show a structure corresponding to that of FIGS. 2a and 2b, except for the provision of liquid cooled cooling bodies 21b instead of the air cooled bodies 21a of FIGS. 2a and 2b. The cooling liquid flows through the cooling bodies 21b and through the connecting conduit elements 24 interposed between one cooling body 21b and the next. Further connecting pieces 24 of vibration-damping material can be provided for supplementary damping of brush vibrations.

Figure 4A:
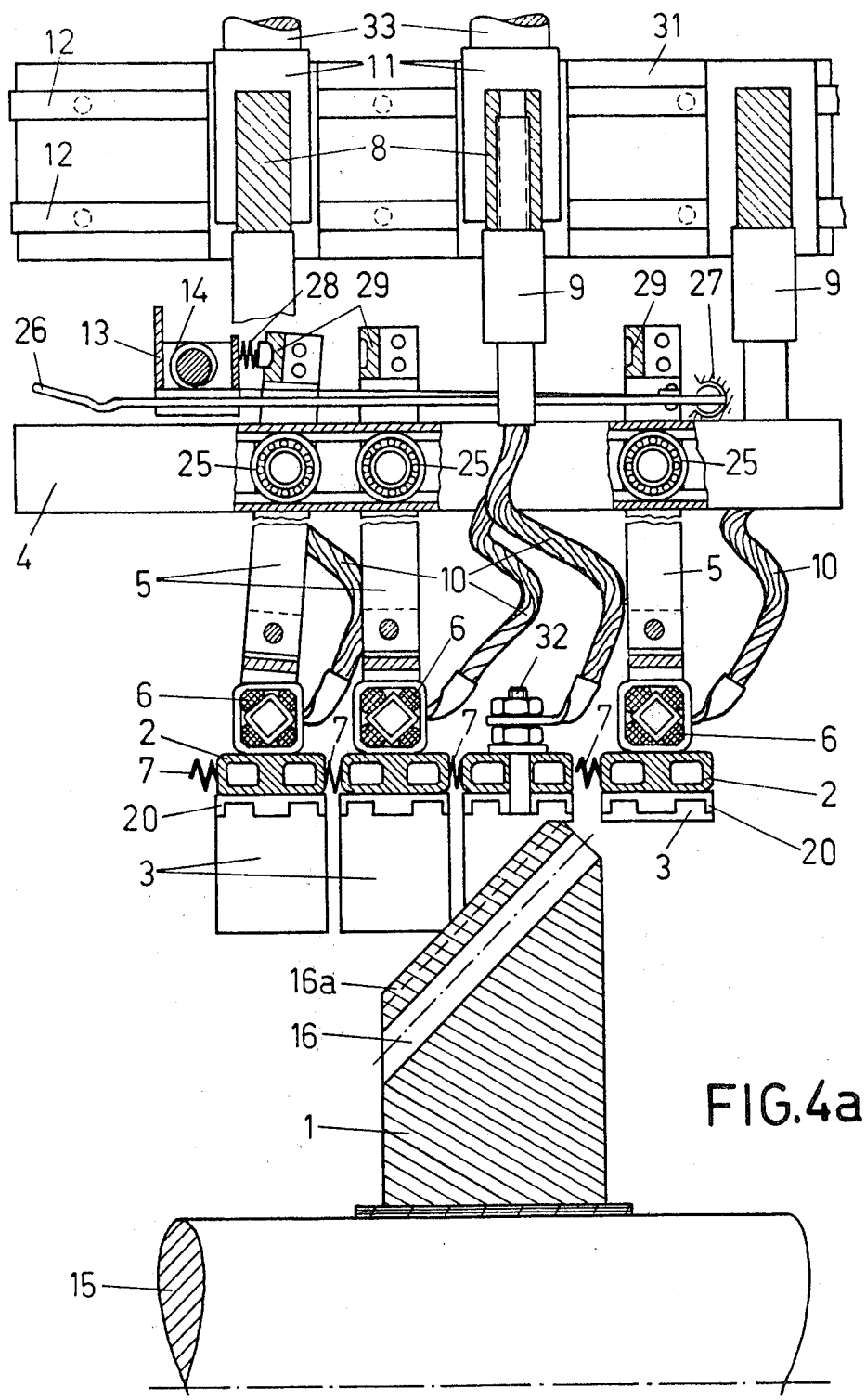
FIG. 4a is the upper half of an axial cross-section of a slip ring and brush arrangement according to the invention together with guiding and resilient connecting and pressure applying means.
Figure 4B:
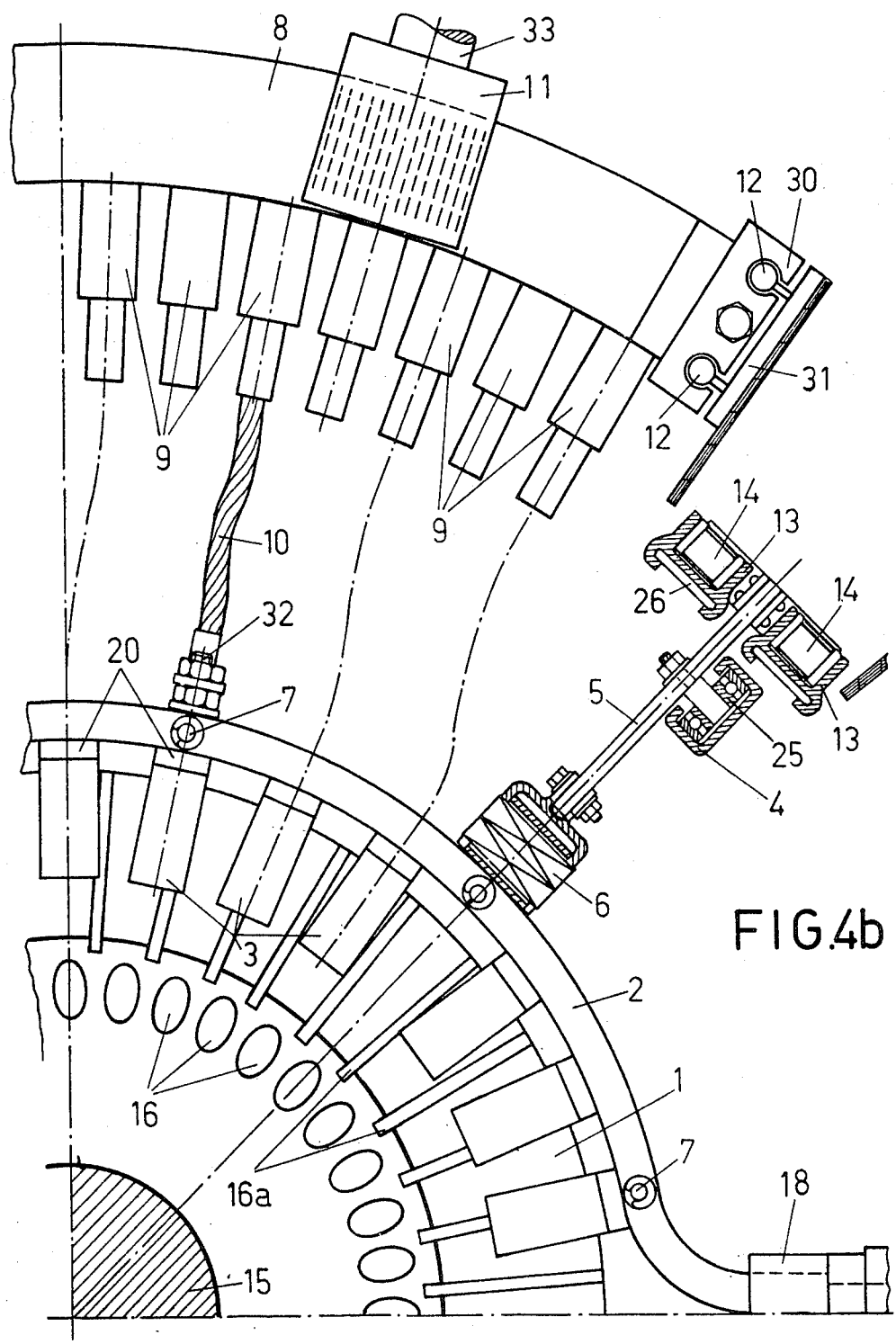

In FIGS. 4a and 4b the parts which have been already illustrated in the other figures are again given the same designations. The slip ring is again designated 1 and its shaft 15. The cooling channels are designated 16, the cooling grooves 16a, the water cooled brush carrier 2, the brush mounting plates 20 and the brushes 3, some of the latter being still whole or only slightly worn and others partly or fully worn away. By the interposition of springs 7 between the individual brush carriers 2, a decoupling of the movement of the individual brush carriers 2 is obtained while an application force is transmitted in the axial direction from one brush carrier 2 to the next towards the slip ring 1.

The conical slip ring 1, in cooperation with the ring-shaped brush carriers 2 succeeding each other in the axial direction with the springs 7 interposed between them, makes possible a continuous progression of the brushes 3 towards and past the slip ring 1. The guiding equipment of the brush carriers 2 consists, for each brush carrier, for four centering arms 5 of insulating material running radially and symmetrically arranged around the circumference of the brush carrier ring (see FIG. 4b). The ends of the centering arms 5 that are nearer the shaft 15 are fastened in each case by a vibration-damping resilient rubber unit 6 to the circumference of the brush carrier 2 in question, while the other ends of the centering arms 5 are each provided with a supporting roller 25 running in the guide channel 4 extending parallel to the axis of the machine in which the rollers are displaceably supported. On each side of the centering arms 5 is arranged a roll-up tape spring 14 having one end fastened to the guide channel 4 and subjecting the centering arms 5 continuously to pressure in the axial direction toward the slip ring 1. The fastening of the roll-up springs 14 is in each case provided at the brush discharge end past guide 26 by means of a linkage 27 so as to affix them pivotably to the associated guide channel 4. Each of the roll-up springs 14 having their unrolled ends made fast to the guide member 26 at the sides of its linkage has its rolled up portion mounted on the guide member 26 by a slider 13 and presses through this slider and a resilient element 28 against the pressure application surface 29 of the free end the centering arm 5 of the ring-shaped brush carrier 2 that is farthest from the slip ring 1. The application of pressure against the brush carriers 2 successively stacked in the axial direction towards the slip ring 1 is thus brought about over the last brush carrier 2 of the sequence to the brush carrier which at the time has its brushes 3 against the slip ring 1, while the aforesaid rubbery resilient unit 6, springs 7, and resilient elemnts 28 cooperate to transmit the axial applied force and thereby provide vibration decoupling as well as vibration damping over brush carrier 2. As a result of the two-part constitution of the brush carriers 2, any of the brush carriers can be taken off or mounted during the operation of the electrical machine whether to add a carrier with new brushes, to remove one with brushes that have just been worn away, whether it is to bring up the new carrier of brushes or to remove one that has just been discharged.

I claim:

1. Slip ring and brush structure for a rotary electric machine, comprising:
   a slip ring (1) coaxial with the rotation axis of said machine having a slip contact surface at least approximately conforming to a zone of a ruled surface symmetrical with respect to said axis, said ruled surface having surface generatrices directed obiquely to said axis, said slip ring being pierced by cooling channels (16) running at least approximately at a constant depth below said slip contact surface and said surface being interrupted by cooling grooves (16a) directed along substantially straight lines and forming no junctions with said channels;
   a plurality of brushes (3) attached to brush carriers (2, 2a), and feed guide means (4, 5, 25) for said brush carriers, said brushes being mounted circumferentially next to each other in each brush carrier array and arranged also to form brush rows parallel to said axis in which brushes attached to adjacent carriers can be caused to succeed each other axially in a continuous manner by said feed guide means, and
   resilient thrust applying and distributing means (6, 7, 14, 28) provided in said feed guide means.

2. Slip ring and brush structure as defined in claim 1, in which said slip contact surface is a developable ruled surface.

3. Slip ring and brush structure as defined in claim 1, in which said slip contact surface is a nondevelopable ruled surface.

4. Slip ring and brush structure as defined in claim 1, in which both said cooling channels and said cooling grooves are directed so that they diverge away from said axis at an oblique angle thereto.

5. Slip ring and brush structure as defined in claim 4, in which at least part of said cooling channels and cooling grooves are respectively centered on and directed along straight lines intersecting said axis.

6. Slip ring and brush structure as defined in claim 4, in which at least part of said cooling channels and cooling grooves are respectively centered on and directed along straight lines skewed with respect to said axis and tangent to a cylindrical surface coaxial therewith.

7. Slip ring and brush structure as defined in claim 6, in which said machine has a shaft on its axis of rotation, said slip ring is mounted thereon and the prolongation of the surfaces of at least part of said cooling channels and cooling grooves would be tangent to the surface of said shaft.

8. Slip ring and brush structure as defined in claim 1, in which said slip contact surface is provided with a network of intersecting cooling grooves (16a).

9. Slip ring and brush structure as defined in claim 8, in which said cooling grooves of said network are centered on straight lines which are generatrices of the ruled surface to a zone of which said contact surface substantially conforms.

10. Slip ring and brush structure as defined in claim 1, in which each of said brush carriers (2) is composed of two semicircular tubes each provided with an input (18) and an outlet for a cooling fluid, and in which the brushes (3) are fastened to the brush carrier (2) by means of brush mounting plates, 11. Slip ring and brush structure as defined in claim 1, in which the brushes are supplied with cooling air through the grooves and channels of the slip ring and are provided at their radial extremities with cooling bodies in contact with the flow of a cooling medium.

12. Slip ring and brush structure as defined in claim 11, in which said cooling bodies (21a) are arranged for contact with a flow of air for cooling.

13. Slip ring and brush structure as defined in claim 11, in which said cooling bodies (21b) are arranged in contact with a flow of liquid for cooling.

14. Slip ring and brush structure as defined in claim 11, in which said cooling bodies are fastened to the brush carrier (2, 2a) through elastic and vibration damping fastening means (23).

15. Slip ring and brush structure as defined in claim 14, in which said fastening means (23) are constituted of bimetal strip structures.

16. Slip ring and brush structure as defined in claim 12, in which an air deflection baffle (22) is provided to deflect cooling air provided through the slip ring (1) by the cooling channels (16) and cooling grooves (16a) thereof, towards the said cooling bodies (21a) for air cooling thereof.

17. Slip ring and brush structure as defined in claim 12, in which said cooling bodies (21b) are connected to each other through vibration damping connection means (24).

18. Slip ring and brush structure as defined in claim 1, in which said feed guide means (4, 5, 25) comprise radially arranged centering arms (5) which are provided at their ends nearer said axis with rubbery resilient elements (6) that are resilient in the direction of said axis and are affixed to and evenly distributed over the circumference of the respective brush carrier (2, 2a), said centering arms (5) being provided at their other ends with roller means for rolling support on a guide member (4) extending in a direction parallel to said axis and thereby shiftable axially, and in which, further, roll-up strip spring means (14) affixed to said guide member (4) are arranged to continually apply axially directed holding pressure on said centering arms towards said slip ring (1) (FIGS. 4a and 4b).

19. Slip ring and brush structure as defined in claim 1, in which a plurality of brush carriers (2, 2a ) in identical form are arranged in succession in the direction of said axis in such a way that said brushes proceed towards contact with the slip ring (1) in succession in axial rows, and rings of brushes approach the slip contact surface coaxially and, further, brushes that have been worn away proceed past the slip ring, and in which spring means (7) operative in the axial direction are provided between adjacent brush carriers.

* * * * *